United States Patent
Ballard, III et al.

(10) Patent No.: US 6,775,550 B2
(45) Date of Patent: Aug. 10, 2004

(54) METHOD OF INDUCING ADSL COMMUNICATION DEVICE TO TRANSMIT AT DOWNSTREAM SIGNALING RATE OPTIMIZED FOR EXTENDED RANGE ADSL SERVICE WITH AUXILIARY POTS CHANNEL OVER SDSL LINK

(75) Inventors: Thomas L. Ballard, III, Madison, AL (US); John B. Wilkes, Jr., Harvest, AL (US); Kevin W. Schneider, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 487 days.

(21) Appl. No.: 09/910,146

(22) Filed: Jul. 20, 2001

(65) Prior Publication Data

US 2003/0016736 A1 Jan. 23, 2003

(51) Int. Cl.[7] ............................................... H04Q 7/20
(52) U.S. Cl. ................ 455/452.2; 379/1.03; 379/93.33; 379/27; 379/28
(58) Field of Search ....................... 455/4.2, 3.04, 455/401, 426.2, 428, 439, 445, 424, 425, 14, 15, 556.1, 452.1, 452.2; 370/281, 540; 375/231, 222, 219; 379/93.32, 93.3, 93.33, 28, 1.03, 27

(56) References Cited

U.S. PATENT DOCUMENTS

| | | | |
|---|---|---|---|
| 4,756,007 A | * | 7/1988 | Qureshi et al. ............. 375/259 |
| 4,890,316 A | | 12/1989 | Walsh et al. |
| 4,924,456 A | | 5/1990 | Maxwell et al. ............... 370/32 |
| 4,991,184 A | | 2/1991 | Hashimoto ..................... 375/8 |
| 5,048,054 A | | 9/1991 | Eyuboglu et al. .............. 375/8 |
| 5,751,796 A | | 5/1998 | Scott et al. |
| 5,784,633 A | * | 7/1998 | Petty ........................... 710/60 |
| 6,091,766 A | | 7/2000 | Yoshida ...................... 375/231 |
| 6,154,524 A | * | 11/2000 | Bremer ..................... 379/10.03 |
| 6,167,034 A | * | 12/2000 | Langberg et al. ........... 370/281 |
| 6,181,711 B1 | * | 1/2001 | Zhang et al. ............... 370/468 |
| 2002/0159457 A1 | * | 10/2002 | Zhang et al. ................ 370/391 |

* cited by examiner

Primary Examiner—Nick Corsaro
Assistant Examiner—Tan Trinh
(74) Attorney, Agent, or Firm—Allen, Dyer, Doppelt, Milbrath & Gilchrist, P.A.

(57) ABSTRACT

An upstream transceiver, coupled to an upstream end of a long haul, single digital subscriber loop of an extended range asymmetrical digital subscriber line communication system, 'spoofs' a (co-located) digital subscriber line access multiplexer to reduce its downstream data rate over a short haul loop to the upstream transceiver. The reduced downstream data rate is compatible with the data rate that can be supported by the long haul loop and also accommodates an auxiliary (64K) POTS channel thereover. The reduced data rate may be derived by preliminary signal quality measurements upon the long communication loop conducted between the upstream transceiver and a downstream transceiver coupled to a remote end of the long haul loop.

20 Claims, 6 Drawing Sheets

METHOD OF INDUCING ADSL COMMUNICATION DEVICE TO TRANSMIT AT DOWNSTREAM SIGNALING RATE OPTIMIZED FOR EXTENDED RANGE ADSL SERVICE WITH AUXILIARY POTS CHANNEL OVER SDSL LINK

CROSS-REFERENCE TO RELATED APPLICATION

The present invention relates to subject matter disclosed in co-pending U.S. patent application, Ser. No. 09/910,707 (hereinafter referred to as the '707 application), filed coincident herewith, by K. Schneider et al, entitled: "SYSTEM FOR PROVIDING EXTENDED RANGE ADSL SERVICE WITH AUXILIARY POTS CHANNEL OVER SINGLE-LINE DIGITAL SUBSCRIBER LINK," and also co-pending U.S. patent application, Ser. No. 09/910,699 (hereinafter referred to as the '699 application) filed coincident herewith, by J. Zakrezewski et al, entitled: "METHOD OF ESTABLISHING SIGNALING PATE FOR SINGLE-LINE DIGITAL SUBSCRIBER LINK PROVIDING EXTENDED RANGE ADSL SERVICE HAVING AUXILIARY POTS CHANNEL," each application being assigned to the assignee of the present application and the disclosures of which are incorporated herein.

FIELD OF THE INVENTION

The present invention relates in general to telecommunication systems and networks, and is particularly directed to a mechanism for automatically training an ADSL communication device, such as a digital subscriber line access multiplexer (DSLAM), to conduct downstream transmissions to a remote (customer) site at a reduced/optimized data rate. By reduced/optimized data rate is meant one that can be expected to be lower than that accommodated by the relatively short distance ADSL link to which the ADSL communication device is immediately coupled. Inducing the DSLAM to train to this reduced data rate means that the DSLAM will transmit at an optimal downstream data rate that can be accommodated by an extended distance single-line digital subscriber link of the type of the type described in the above-referenced '707 application, which is configured to provide extended range asymmetric digital subscriber line (ADSL) service together with an auxiliary plain old telephone service (POTS) channel.

BACKGROUND OF THE INVENTION

As described in the above-referenced co-pending applications, the ability to conduct high-speed data communications between remotely separated data processing systems and associated subsystems and components has become a requirement of a variety of industries and applications such as business, educational, medical, financial and personal computer uses, and it can be expected that current and future applications of such communications will continue to engender more systems and services in this technology.

Associated with such applications has been the growing use and popularity of the "Internet", which continues to stimulate research and development of advanced data communications systems between remotely located computers, especially communications capable of achieving relatively high-speed data rates over an existing signal transport infrastructure (e.g., legacy copper cable plant).

One technology that has gained particular interest in the telecommunication community is digital subscriber line (DSL) service, which enables a public service telephone network (PSTN) to deliver (over limited distances) relatively high data bandwidth using conventional telephone company copper wiring infrastructure. DSL service has been categorized into several different technologies, based upon expected data transmission rate, the type and length of data transport medium, and schemes for encoding and decoding data.

Regardless of its application, the general architecture of a DSL system essentially corresponds to that diagrammatically shown in FIG. 1, wherein a pair of remotely separated mutually compatible digital communication transceivers are coupled to a communication link, such as a twisted pair of an existing copper plant. One of these transceivers, denoted as a 'west site' DSL transceiver 11, is typically located in a digital subscriber line access multiplexer (DSLAM) 12 at a network controller site 13 (such as a telephone company central office (CO)). The other transceiver, denoted as an 'east site' DSL modem 21, may be coupled with a computer 22 located at a customer premises 23, such as a home or office.

Within the communication infrastructure of the telephone company, the 'west site' DSLAM 12 is coupled with an associated network 'backbone' 15, which communicates with various information sources 31 and the Internet 33. This telecommunication fabric thus allows information, such as Internet-sourced data (which is readily accessible via the backbone network 15), to be transmitted from the central office DSL transceiver 11 over the communication link 10 to the compatible DSL transceiver 21 at the customer site 23.

In a DSL system of the type described above, the data rates between DSL transceivers are considerably greater than those for voice modems. For example, while voice modems typically operate at voice frequency band, from DC up to a frequency on the order of 4 KHz (with data rates around 28 Kbps), DSL data transceivers may operate in a bandwidth between 25 KHz to well over 1 Mbps, with data rates typically greater than 200 Kbps and up to 50 Mbps (as in the case of a Very-high-data-rate Digital Subscriber Line (VDSL)). This voice/data bandwidth separation allows high-speed data transmissions to be frequency division multiplexed with a separate voice signal over a common signal transport path.

Moreover, the high-speed frequency band used for ADSL data communications may be 'asymmetrically' subdivided or separated (as per (1998) ANSI standard T.413) as shown in FIG. 2, to allocate a larger (and higher frequency) portion of the available spectrum for 'downstream' (west-to-east in FIG. 1) data transmissions from the central office site to the customer site, than data transmissions in the 'upstream' direction (east-to-west in FIG. 1) from the customer site to the central office.

As a non-limiting example, for the case of a single twisted copper pair, a bandwidth on the order of 25 KHz to 125 KHz may be used for upstream data transmissions, while a considerably wider bandwidth on the order of 130 KHz to 1.2 MHz may be used for downstream data transmissions. This asymmetrical downstream vs. upstream allocation of ADSL data bandwidth is based upon the fact that the amount of data transported from the central office to the customer (such as downloading relatively large blocks of data from the Internet) can be expected to be considerably larger than the amount of information (typically e-mail) that users will be uploading to the Internet.

Fortunately, this relatively wide separation of the upstream and downstream frequency bands facilitates filtering and cancellation of noise effects, such as echoes, by relatively simple bandpass filtering techniques. For example, an upstream echo of a downstream data transmission will be at the higher (downstream) frequency, when received at the central office, so as to enable the echo to be easily filtered from the lower (upstream) frequency signal. Frequency division multiplexing also facilitates filtering of near-end crosstalk (NEXT), in much the same manner as echo cancellation.

In addition to ADSL, there are a number of other DSL technologies, such as High-Bit-Rate Digital Subscriber Line (HDSL), Symmetric Digital Subscriber Line (SDSL), and Very-high-data-rate Digital Subscriber Line (VDSL). Also, HDSL2 (ANSI Standard T.418 (2000)) uses one twisted pair for full duplex 1.544 Mbps payload delivery up to a distance on the order of 18 kft.

Among these, HDSL, unlike ADSL described above, has a symmetric data transfer rate—communicating at the same speed in both upstream and downstream directions. Currently perceived data rates for HDSL are on the order of 1.544 Mbps of bandwidth; however HDSL requires more signal transport infrastructure—two copper twisted pairs. In addition, the operating range of HDSL is more limited than that of ADSL, and is currently considered to be effective at distances of up to approximately 12,000 feet or less, beyond which signal repeaters are required.

SDSL (which is described in ITU standards publications) delivers symmetric data transfer speed that is comparable to HDSL2; however, as pointed out above, it employs only a single twisted copper pair; consequently, its range is currently limited to approximately 10,000 feet. SDSL rates are dependent upon line characteristics, such as wire gauge, bridge taps, etc. SDSL may employ rates greater than HDSL2 on short twisted pairs. VDSL provides asymmetric data transfer rates at considerably higher speeds, e.g., on the order of 13 Mbps to 52 Mbps downstream, and 1.5 Mbps to 2.3 Mbps upstream, which severely limits its range (e.g., 1,000 to 4,500 feet).

In addition to performance considerations and distance limitations for transporting DSL communications over a conventional twisted-pair infrastructure, the cost of the communication hardware is also a significant factor in the choice of what type of system to deploy. In this regard, a lower data rate DSL implementation may offer high-speed data communications, for example, at downstream data rates on the order of or exceeding 1 Mbps, over an existing twisted-pair network and at a cost competitive with conventional non-DSL components, such as V.34, V.90, and ISDN modems (e.g., 28.8 Kbps to 128 Kbps). ISDN is occasionally referred to as IDSL and is sometimes considered as a DSL technology. Still, many telecom service providers currently desire to deliver relatively low cost (repeaterless) ADSL service over extended distances (e.g., on the order of 25 kft). Hence, there is a need for an ADSL line extender.

Pursuant to the invention described in the above-referenced '707 application, this objective is achieved by inserting, between the central office and remote nodes of an existing ADSL infrastructure, a hybrid SDSL-ADSL range-extending data/POTS communication scheme shown diagrammatically in FIG. 3. Like the ADSL system of FIG. 1, the ADSL range extending scheme of FIG. 3 contains a pair of remotely separated (relatively 'upstream' and 'downstream') communication sites 100 and 200 that communicate with one another over a link 300. In the system of FIG. 3, this link is an SDSL link. By virtue of the communication range-extending functionality of the system of FIG. 3, the length of the intersite link 300 may be on the order of up to 25 kft, which is considerably greater than the customary maximum 10–12 kft distance for conventional ADSL applications.

The upstream (or network-associated) site 100 may correspond to a telephone network controller site, such as a telephone company (telecom) central office, containing a central office switch (such as a conventional AT&T 5ESS switch) 102, through which POTS service is customarily provided. The network site also contains auxiliary digital communication equipment (such as a DSLAM) 104, which provides backbone communications via a channel service unit (CSU), that is coupled by way of a fiber optic line or DS3 transporting copper plant with additional information sources and the Internet.

The Internet service provider (ISP) may be at another location, operated separately from the central office. On the other hand, if the telephone service provider operating the central office equipment also provides Internet access, the ISP may correspond to a separate function within the central office proper or elsewhere in its network. The auxiliary equipment is typically provided relatively close to the central office (often within the same installation as the central office switch). This relatively short distance readily enables high-speed data communications using ADSL protocol by way of a two-wire pair 116 coupled between the DSLAM 104 and an ADSL Extender-C (Central Office) or 'ALE-C' 120 to be described.

Network site 100 also includes a splitter/combiner 110, which is coupled over an auxiliary signal (POTS link) 112 to the switch 102 and over an ADSL signal link 114 to the DSLAM 104. In the downstream direction, the splitter/combiner 110 combines the relatively low frequency POTS signal with the higher frequency ADSL signal for FDM transport over link 116 to the ALE-C 120. The ALE-C 120 comprises an ADSL Loop Extender architecture as shown in FIG. 4, to be described, and contains respective POTS and ADSL processing subsystems, and an associated TC PAM transceiver that serves as the communication interface with the SDSL path 300.

These subsystems process and interface the composite POTS and ADSL signals from the splitter/combiner 110 as a downstream multiplexed data stream over the SDSL link 300 to the customer site 200. They also interface an upstream multiplexed data stream received over the SDSL link 300 from the customer site 200 into a composite POTS and ADSL FDM signal for delivery over the link 116 to the splitter/combiner 110. In the upstream direction, the splitter/combiner 110 contains filter circuitry (such as a low pass filter installed a POTS path thereof) that separates an upstream-directed, low frequency POTS signal from the higher frequency ADSL signal within the FDM signal supplied from the ALE-C 120, for delivery to the switch 102 and the DSLAM 104, respectively.

The downstream (or customer-associated) site 200 may correspond to a customer premises, such as a home or office, and contains a computer 202 and an associated ADSL modem 204, plus a POTS telephone 206. Complementary to the network site 100, the customer site 200 contains a splitter/combiner 210, which is coupled over a POTS signal link 212 to the POTS phone 202, and over an ADSL signal link 214 to the ADSL modem 204. In the downstream direction, splitter/combiner 210 contains filter circuitry that splits the downstream POTS signal from the ADSL signal within the FDM (POTS and ADSL) signal, supplied over a two-wire pair 216 from an ADSL Loop Extender-R (Remote) or 'ALE-R' 220, for delivery to POTS phone 206 and customer modem 204, respectively.

In the upstream direction, the splitter/combiner 210 combines the relatively low frequency POTS signal from the POTS phone 206 with the higher frequency ADSL signal from the ADSL modem 204 for FDM transport over the pair 216 to ALE-R 220. Like the ALE-C 120 of the network site 100, ALE-R 220 is comprised of an ADSL Loop Extender architecture as shown in FIG. 4. In the downstream direction, ALE-R 220 interfaces a downstream multiplexed data stream received over the SDSL link 300 from the network site 100 into a composite FDM POTS and ADSL signal for delivery over the link 216 to the splitter/combiner 210. In the upstream direction, the ALE-R 220 interfaces a composite POTS and ADSL signal from the splitter/combiner 210 as an upstream multiplexed data stream for TC-PAM transmission over the SDSL link 300 to the network site 100.

FIG. 4 shows the architecture of a respective ADSL Loop Extender (ALE) that is installed at each of the network (central office (C)) site 100 and the customer (remote (R)) site 200 of the extended range communication system of FIG. 3. On the ADSL/POTS interface side, the ALE has an FDM port 401 coupled to a respective one of the twisted pairs 116 and 216. Port 401 is coupled to each of a POTS channel processing subsystem 410 and an ADSL channel processing subsystem 420. The POTS channel subsystem 410 includes a low pass filter (LPF) 411, having a bandpass characteristic associated with POTS voice frequencies, coupled in circuit with a ($\mu$-law) codec 412.

In the 'to the SDSL link' direction (towards the SDSL link 300), codec 412 is operative to perform $\mu$-law encoding of the filtered POTS signals applied to a multiplexer-demultiplexer (mux/demux) 413, under the control of a supervisory communications controller (microprocessor) 414. In the 'from the SDSL link' direction (from the SDSL link 300), codec 412 is operative to perform $\mu$-law based decoding of a received 64 Kbps POTS channel from the mux/demux 413. The ADSL channel subsystem 420 includes an asymmetric transceiver unit-remote (ATU) 421, that is coupled between the FDM port 401 and an ATM transceiver 422.

The ATM transceiver 422 contains of a cascaded arrangement of signal processing components (described below with reference to FIGS. 5 and 6), that perform a prescribed set of signal processing functions associated with reception, timing adjustment, and transmission of ATM cell-based ADSL data traffic, including framing, deframing, scrambling, descrambling, idle cell-insertion, etc. For ADSL communications in the 'to the SDSL link' direction, the ATM transceiver 422 supplies the mux/demux 413 with a modified ATM data stream containing (timing adjustment) idle cells that have been controllably inserted into the ATM cell data provided by the ATU 421, under the control of communications controller 414. In the 'from the SDSL link' direction, ATM transceiver 422 receives a similar rate-adjusted ATM data stream output by the mux/demux 413 for application to and processing by the ATU 421.

Mux/demux 413 is interfaced with the SDSL link 300 via a symmetric DSL transceiver unit (STU) 423. STU 423 is operative to perform TC-PAM based modulation of the output of a composite digitized POTS and data rate-adjusted ATM data stream provided by mux/demux 413 for application to SDSL link 300. It also performs TC-PAM demodulation of the output of the composite digitized POTS and data rate-adjusted ATM data stream received from the SDSL link 300. For a non-limiting example of documentation describing the architecture and range extension signal processing functionality of a TC-PAM based digital communication transceiver, attention may be directed to the U.S. Pat. No. 5,809,033 to M. Turner et al, entitled: "USE OF MODIFIED LINE ENCODING AND LOW SIGNAL-TO-NOISE RATIO BASED SIGNAL PROCESSING TO EXTEND RANGE OF DIGITAL DATA TRANSMISSION OVER REPEATERLESS TWO-WIRE TELEPHONE LINK," assigned to the assignee of the present application, and the disclosure of which is herein incorporated.

The signal processing functionality of a network (central office (C)) site ATM transceiver 422-C installed within the ALE-C 120 at the network site 100 is shown in the block diagram of FIG. 5, while that of a similar customer site ATM transceiver 422-R within the ALE-R 220 at the customer site 200 is shown in the block diagram of FIG. 6. While the signal processing architectures of ATM transceivers 422-C and 422-R are the same, each ATM transceiver will be described separately, as their respective operational (data rate) parameters are defined by the asymmetrical downlink and uplink communication properties of the link.

Considering first the network site ATM transceiver 422-C of FIG. 5, its signal flow path in the 'to the SDSL link' or downstream direction includes a cascaded arrangement of a CELLDELIN_ATM operator or block 431, an ATMFIFO_2CELL block 433, and a GENCELLS_ATM block 435. In the 'from the SDSL link' or upstream direction, the signal flow path through the ATM transceiver 422-C includes a cascaded arrangement of a CELLDELIN_ATM block 441, an ATMFIFO_2CELL block 443, and a GENCELLS_ATM block 445. Each of these blocks, preferably implemented in an FPGA, as described above, performs conventional signal processing functions to be described.

In the downstream path, the CELLDELIN_ATM block 431 is coupled to receive DSLAM-originated ATM traffic, as extracted by the ATU 421 from the composite FDM channel applied to the FDM port 401 from the two-wire path 116. The CELLDELIN_ATM block 431 deframes the serial ATM cells coming from the DSLAM 104, descrambles the deframed ATM cells and then writes them into the ATMFIFO_2CELL block 443. As its name implies, the ATMFIFO_2CELL block 443 comprises a two (ATM) cell-deep, first-in, first-out shift-register (FIFO). The two (ATM) cell depth of ATMFIFO_2CELL block 443 has been found to provide for transmission timing adjustment or bit-slip compensation, while at the same time reducing hardware complexity.

The GENCELLS_ATM block 435 serially reads out the contents of the ATMFIFO_2CELL block 433 at a prescribed downstream data rate (N×32K bits per second), where N is based upon the data rate at which the downstream ADSL path from the DSLAM to the ALE-C is running. In a preferred embodiment, this downstream ADSL data rate is one which has been 'optimized' for the SDSL link, in accordance with the ADSL data rate optimization mechanism of the present invention.

As will be described, this data rate optimization scheme induces or 'spoofs' the DSLAM into perceiving that the line characteristics of the relatively short haul link to which it is coupled are apparently insufficient to support a much higher data rate. The reduced 'target' downstream data rate to which the DSLAM is trained is one which is compatible with the data rate that can be supported by the SDSL link, and also accommodate an auxiliary (64K) POTS channel. In a preferred embodiment, this target SDSL data rate is derived by means of the SDSL autobaud mechanism of the above-referenced '699 application, which iteratively performs a sequence of signal power and quality-based measurements over the SDSL loop between the ALE-C 120 and the ALE-R 220.

Pursuant to this autobaud mechanism, the ALE-R 220 initially transmits at a prescribed known power level on the SDSL link 300. Based upon a comparison of the power level received by the ALE-C 120 with the known power level at which the ALE-R transmitted, the ALE-C estimates the length of SDSL loop 300. From this SDSL loop length estimate, the ALE-C selects a potentially acceptable baud rate and informs the ALE-R of the initial baud rate. The ALE-R then initiates an SDSL training session between the two sites, at the initially selected signaling rate. If the SDSL loop does not successfully train at the initially selected signaling rate, the ALE-C tells the ALE-R to reduce the baud rate and/or the number of bits/baud, and a further attempt is made to train the SDSL loop. This iterative process continues until the SDSL loop successfully trains.

Once the SDSL loop successfully trains, the SDSL loop signal quality is measured by the ALE-C to determine whether the baud rate will run reliably with the existing noise on the link. If not, the ALE-C tells the ALE-R to reduce the baud rate and/or the number of bits/baud, and the ALE-R restarts the training data sequence, at a reduced number of bits/baud. The iterative training process is then repeated, as necessary until the SDSL loop successfully trains, and the measured signal quality exhibits an acceptable signal-to-noise ratio. The resulting SDSL data rate is employed by the ALE-C to initiate the DSLAM-spoofing routine, and the ALE-C and the ALE-R are placed in data mode.

When operating in data mode, the signal quality is continually monitored. Should the noise level on the SDSL link increase during data mode to a level that results in a less than acceptable signal quality, the ALE-C will transmit a 'reduce baud rate—bits/baud' message to the ALE-R, in response to which the ALE-R restarts the training data sequence, at a further reduced baud rate and/or number of bits/baud. The iterative training and signal quality measurement routine, described above, is then repeated, as necessary, until the loop successfully trains at an acceptable signal-to-noise ratio, at which time the ALE-C and ALE-R are again placed in data mode.

During downstream data mode, as the GENCELLS_ATM block 435 reads out the ATMFIFO_2CELL block 433, it controllably inserts idle ATM cells at a preselected rate (e.g., 8K bits per second, as shown in the downstream portion of the data rate transport diagram of FIG. 9) to make up for any timing difference between the ALE-C 120 and DSLAM 104. This controllably modified ATM cell data rate of N×32K+8K bits per second on the SDSL link 300 thus enables the timing (clocking) of the ALE-C 120 to be asynchronous to the DSLAM in the downstream direction. In the present example, the choice of an 8K bits per second as the idle cell insertion rate provides for DSLAM-ALE-C timing adjustment, while maintaining the SDSL baud rate at a value that will not substantially impair the range extension functionality of the TC-PAM encoding performed by the STU 423.

The GENCELLS_ATM block 435 then scrambles the resulting serial cell stream (containing both FIFO-extracted ATM cells and inserted idle ATM cells), and couples the resulting scrambled bit stream to the mux/demux 413, where the retimed and controllably modified ATM cell stream (now having a data rate of (N×32K+8K) bits per second) is combined with the encoded POTS data stream from the codec 412 for application to the STU 423 and TC-PAM based transmission over the SDSL link 300 to the customer site 200.

Before describing the operation of the upstream signal flow path through the ALE-C's ATM transceiver 422-C, the signal processing functionality of the downstream signal flow path through the customer site ATM transceiver 422-R (FIG. 6), to which the retimed and controllably modified ATM cell stream (having a data rate of (N×32K+8K) bits per second) within the serial data stream transmitted over the SDSL link 300 from the 'upstream' TC-PAM based transceiver 423 at the network site 100, will be described.

As shown in FIG. 6, similar to the network site's ATM transceiver 422-C, the downstream (here, 'from the SDSL loop') signal flow path through the customer site's ATM transceiver 422-R includes a cascaded arrangement of a CELLDELIN_ATM block 451, an ATMFIFO_2CELL block 453 and a GENCELLS_ATM block 455. In the 'to the SDSL link' or upstream direction, the signal flow path through the customer site ATM transceiver 422-R includes a similar cascaded arrangement of a CELLDELIN_ATM block 461, an ATMFIFO_2CELL block 463 and a GENCELLS_ATM block 465.

In the downstream path, the CELLDELIN_ATM block 451 is coupled to receive the serial DSLAM-originated ATM traffic, as transmitted downstream over the SDSL link 300 from the network site's STU 423 and TC-PAM demodulated by a complementary, customer site STU 423 in the ALE-R 220, which terminates the SDSL link 300. The (N×32K+8K) ATM stream as demultiplexed by the ALE-R's mux/demux 413 is coupled to the CELLDELIN_ATM block 451, which deframes the serial ATM cells coming from the upstream DSLAM 104, descrambles the deframed ATM cells and then writes them into ATMFIFO_2CELL block 453.

The GENCELLS_ATM block 455 controllably reads out the contents of the ATMFIFO_2CELL block 453 at the effective received ATM cell data rate (here N×32K+8K bits per second). In the course of reading out the contents of ATMFIFO_2CELL block 453, the GENCELLS_ATM block 455 controllably inserts additional idle ATM cells at a rate that is compatible with the requirement that downstream ADSL circuitry be able to train on 32K bit boundaries of ATM cell data.

For the N×32K+8K bits per second data rate of the received downstream ATM cell traffic in the present embodiment, this is readily accomplished at the GENCELLS_ATM block 455 by controllably inserting additional idle cells at 24K bits per second, to realize a total data rate of (N+1)×32K bits per second. It should be noted that since the higher idle cell insertion rate (24K) occurs at the downstream end of the SDSL link 300, it does not affect the SDSL baud rate and therefore will not impair the range extension functionality of TC-PAM encoding performed by upstream STU 423.

The GENCELLS_ATM block 455 of the ALE-R's ATM transceiver 422-R then scrambles the (N+1)×32K serial ATM cell stream (containing both the ATM cells extracted from FIFO 453 and additionally inserted 24K idle ATM cells), and couples the resulting scrambled bit stream to the ATU 421 for application to the link 216 and delivery via downstream splitter 210 to the ADSL modem 204.

For the upstream path from the customer site 200 to the network site 100, the ALE-R's ATM transceiver 422-R includes a CELLDELIN_ATM block 461 coupled to receive customer modem-originated ATM traffic, as extracted by the ATU 421 from the composite FDM signal applied to the FDM port 401 from the two-wire path 216. The CELLDELIN_ATM block 461 deframes the serial ATM cells coming from the customer modem 204, descrambles the deframed ATM cells and then writes them into the ATMFIFO_2CELL block 463.

As described previously, in the upstream path, the ALE-R's CELLDELIN_ATM operator 461 receives customer modem-originated ATM traffic, as extracted by the ATU 421 from the composite FDM signal applied to the FDM port 410 from the short haul path, deframes the serial ATM cells coming from the customer modem, and descrambles the deframed ATM cells. It then writes them into upstream ATMFIFO_2CELL FIFO 463 at the rate of the ADSL modem link.

If the DSLAM upstream data rate is less than or equal to the SDSL data rate, this modem link rate may be defined as having an effective upstream data rate of (M−1)×32 Kbps, where M is the DSLAM's upstream data rate, so that the ALE-R's upstream CELLDELIN_ATM operator 461 writes into the FIFO 463 at (M−1)×32 Kbps. If the DSLAM upstream data rate (M) is greater than the SDSL data rate (P), this modem link rate may be defined as having an upstream data rate of P×32 Kbps, and the CELLDELIN_ATM operator 461 writes into the FIFO 463 at an effective upstream data rate of P×32 Kbps.

When reading out the contents of the ATMFIFO_2CELL block 463, GENCELLS_ATM block 465 controllably inserts idle ATM cells at a preselected rate (e.g., 8K bits per second) to provide for any timing difference between the ALE-C 120 and DSLAM 104, as described above. Thus, where the DSLAM upstream data rate M is less than or equal to the SDSL data rate, the resultant effective data rate produced by the GENCELLS_ATM block 465 will be [(M−1)×32K]+8K bits per second. On the other hand, where the DSLAM upstream data rate M is greater than the SDSL data rate (P), the resultant effective data rate produced by the GENCELLS_ATM block 465 will be [P×32K]+8K bits per second.

The GENCELLS_ATM block 465 scrambles the resulting serial cell stream (containing both FIFO-extracted ATM cells and inserted idle ATM cells), and couples the resulting scrambled bit stream to the mux/demux 413 of the ALE-R 220, where the retimed and controllably modified ATM cell stream is combined with the encoded POTS data stream from the codec 412 for application to the customer site's STU 423 and TC-PAM based transmission over the SDSL link 300 to the network site 100.

In the upstream path of the ALE-C's ATM transceiver 422-C at the network site 100, CELLDELIN_ATM block 441 is coupled to receive the serial (upstream) modem-originated ATM traffic, as transmitted over the SDSL link 300 from the customer site, and TC-PAM demodulated by the network site's STU 423, which terminates the network end of SDSL link 300. The upstream ATM data stream (having a data rate of [(M−1)×32K]+8K or a data rate of (P×32K)+8K, depending upon the relationship between the DSLAM data rate M and the SDSL rate P, as described above) is demultiplexed by the ALE-C's mux/demux 413 and coupled to the CELLDELIN_ATM block 441. The CELLDELIN_ATM block 441 deframes the serial ATM cells coming from the downstream modem 204, descrambles the deframed ATM cells and writes them into the ATMFIFO_2CELL block 443.

The GENCELLS_ATM block 445 then controllably reads out the contents of the ATMFIFO_2CELL block 443 at the effective received ATM cell data rate and controllably inserts additional idle ATM cells at a rate that is compatible with the requirement that ADSL circuitry be able to train on 32K bit boundaries of the ATM cell data. For the (M−1)× 32K+8K bits per second data rate, this is readily accomplished by inserting additional idle cells at 24K bits per second, to realize a total data rate of M×32K bits per second. For the (P×32K)+8K bits per second data rate, this is accomplished by inserting additional idle cells so as to realize a total data rate of [(M−P−1)×32K]+24K or M×32K bits per second.

The M×32 Kbps serial ATM cell stream (containing both the ATM cells extracted from the FIFO 463 and additionally inserted idle ATM cells), is scrambled by the GENCELLS_ATM block 445 and coupled to the ATU 421 for application as an ADSL signal over short haul loop 116 to DSLAM 104.

As described above, the SDSL-implemented ADSL range-extending communication subsystem of the '707 application employs three separate links to deliver ADSL service to the customer. The first (at the upstream end of the system) is the (ADSL plus POTS) short haul loop 114 between the DSLAM 104 and the ALE-C 120 (co-located with the DSLAM). The second is the (TC-PAM based ATM plus encoded POTS transporting) SDSL link 300 between the ALE-C 120 at the central office site 100 and the ALE-R 220 at the customer site 200. The third is the (ADSL plus POTS) short haul loop 214 between ALE-R 220 and modem 224 at the customer site 200.

As the first and third loops are relatively short, they can be expected to readily train at data rates of 1 Mbps or more in both the upstream and downstream directions; as a result, the limiting factor for upstream and downstream transmissions is the data rate that can be supported by the second (SDSL) link. The data rate for the third loop is readily established by the ALE-R 220, which is able to set its upstream and downstream rates to match the respective rates used by the ALE-C at the central office. In a similar manner, the upstream rate from the ALE-C 120 to the DSLAM 104 is achieved by controllably inserting idle ATM cells, as described above.

However, the downstream portion of the first (ADSL) loop from the DSLAM 104 to the ALE-C 120 cannot be so controlled (by directly setting the data rate or inserting idle ATM cells). As far as the DSLAM is concerned, it sees a short haul link that will allow the DSLAM to ship data in the downstream direction at a relatively high data rate. Because this data rate can be expected to substantially exceed the transport capability of the SDSL link, the DSLAM cannot be allowed to transmit at this data rate; otherwise, the system would 'crash'.

SUMMARY OF THE INVENTION

In accordance with the present invention, this problem is successfully remedied by a DSLAM-'spoofing' mechanism that is executed by the (data communications controller of) the ALE-C, and which is operative to induce (or 'spoof') the DSLAM to employ a (reduced) downstream ADSL data rate that is compatible with the data rate that is supported by the SDSL link (and also accommodates an auxiliary (64K) POTS channel). Pursuant to a reduced hardware complexity implementation, the invention employs a set of limited size (e.g., eight bit) buffers to store various parameters associated with the optimization routine. One of these buffers stores a RATE_LIMIT code, that is used to overwrite a short haul ADSL link's signal-to-noise ratio (SNR) value reported to the DSLAM by the ALE-C, to spoof the DSLAM into training present application, and the disclosure of which is herein incorporated.

The signal processing functionality of a network (central office (C)) site ATM transceiver 422-C installed within the ALE-C 120 at the network site 100 is shown in the block diagram of FIG. 5, while that of a similar customer site ATM transceiver 422-R within the ALE-R 220 at the customer site 200 is shown in the block diagram of FIG. 6. The signal processing architectures of ATM transceivers 422-C and 422-R are the same; however, as their respective operational (data rate) parameters are defined by the asymmetrical downlink and uplink communication properties of the link, each ATM transceiver will be described separately.

Considering first the network site ATM transceiver 422-C of FIG. 5, its signal flow path in the 'to the SDSL link' or downstream direction includes a cascaded arrangement of a CELLDELIN_ATM operator or block 431, an ATMFIFO_2CELL block 433, and a GENCELLS_ATM block 435. In the 'from the SDSL link' or upstream direction, the signal flow path through the ATM transceiver 422-C includes a similar cascaded arrangement of a CELLDELIN_ATM block 441, an ATMFIFO_2CELL block 443, and a GENCELLS_ATM block 445. Each of these blocks, which are preferably implemented in an FPGA, as described above, performs conventional signal processing functions to be described. the short haul ADSL link at a data rate lower than it is capable of supporting.

In order to ensure that the DSLAM will train at a data rate no higher than the data rate that can be supported by the SDSL link (and also providing an auxiliary (64K) POTS channel), the DSLAM-spoofing mechanism is initially supplied with a "TARGET" SDSL data rate for the SDSL loop. In a preferred embodiment, this TARGET SDSL data rate is derived by means of the SDSL autobaud mechanism of the above-referenced '699 application, described above.

The data rate to which the DSLAM is to train may be either a 'fixed' mode data rate, or a 'best efforts' mode data rate. Fixed mode corresponds to the use of a non-adjustable data rate that has been predefined by the telecom service provider, and will typically correspond to a minimum data rate guaranteed to the customer. There is no modification of this data rate; it either conforms with the TARGET SDSL data rate or it doesn't. Best efforts mode corresponds to the essence of the invention in inducing the DSLAM to adjust its data rate until it conforms with the SDSL data rate.

The minimum guaranteed data rate may range over a prescribed set of values, e.g., between 256K to 896K, at 128K increments. For a 512K×384K service subscription, the guaranteed downstream data rate is 512 Kbps and the upstream data rate is 384 Kbps. In order to provide the 512K downstream data rate (plus the 64K POTS channel), the SDSL link would have to support at least at 512K+64K or 576 Kbps.

When the ALE-C is to operate in fixed data rate mode (in which there is no adaptive training of the DSLAM's data rate), the RATE_LIMIT buffer is loaded with an "OVERWRITE DISABLE" code value (e.g., $FF_{HEX}$) that prevents overwriting the data rate that has been pre-established by the telecom service provider. After this preliminary step, the routine then transitions to an ADSL training sub-routine, which is carried out for both fixed rate and best efforts modes.

When the ALE-C is to operate in best efforts mode, a 'calibration' training sequence is initially carried out. This calibration sequence serves to allow the DSLAM to train at some initial data rate, that may be subsequently reduced down to a value that will conform with the TARGET SDSL data rate. For this purpose, the RATE_LIMIT buffer is loaded with a prescribed digital code (e.g., $40_{HEX}$) that tells the DSLAM where to set the calibration data rate. The data rate associated with this RATE_LIMIT code may vary depending upon the operational parameters of a particular DSLAM vendor's equipment. It is expected to be relatively fast (e.g., in excess of 1 Mbps), given the relative short length of the ADSL short haul link between the DSLAM and the ALE-C.

The calibration subroutine then conducts an ADSL train. Once the ADSL link is trained, the actual data rate representative digital code ("ACTUAL") at which the ADSL link trained (which can be expected to be in excess of 1 Mbps) is stored in a "CALIBRATE" buffer. Following the calibration train, the difference between the value ($40_{HEX}$) in the RATE_LIMIT buffer and the ACTUAL data rate code is loaded into a "max_down_adjust" buffer. This code difference corresponds to a maximum (MAX) offset between the data rate at which the DSLAM-to-ALE-C link was originally expected to train and the data rate at which this link actually trained. Due to the relatively short distance between the DSLAM and the ALE-C, the MAX difference code is usually a relatively small positive number.

The initial code stored in the RATE_LIMIT buffer is replaced with by the "TARGET" digital code representative of the actual SDSL data rate. The routine then drops the ADSL link and transitions to a rate limit minimization sub-routine. A first step of this sub-routine is to determine whether the contents of the max_down_adjust buffer are negative or positive. If negative, it is inferred that the difference between the initial calibration data rate at which the loop is expected to train and the data rate at which it has actually trained is relatively large. In this case, a determination is made as to whether adding the digital value currently stored in the RATE_LIMIT BUFFER (the TARGET SDSL data rate) to that stored in the max_down_adjust buffer will result in an underflow of the max_down_adjust buffer. If so, the sub-routine replaces the TARGET data rate code in the RATE_LIMIT buffer with a minimum (non-zero) value of '1'. However, if the sum of the contents of the RATE_LIMIT BUFFER and the max_down_adjust buffer is non-negative), the TARGET SDSL data rate code in the RATE_LIMIT buffer is increased by the contents of the max_down_adjust buffer (representative of the difference between the value ($40_{HEX}$) and the data rate at which the eventually ADSL link trained).

If the contents of the max_down_adjust buffer are positive, it is inferred that the data rate at which the loop has actually trained is relatively close to its expected value, and the sub-routine determines whether adding the contents of the RATE_LIMIT BUFFER to the max_down_adjust buffer will result in an overflow of the max_down_adjust buffer. If not, the (TARGET SDSL data rate) code in the RATE_LIMIT buffer is increased by the contents of the max_down_adjust buffer (representative of the difference between the value ($40_{HEX}$) and the data rate at which the eventually ADSL link trained). Otherwise, the TARGET SDSL data rate associated code in the RATE_LIMIT buffer is replaced by an all one's value of $FF_{HEX}$ (that disables overwriting the SNR reported to the DSLAM, as pointed out above). The RATE_LIMIT buffer now contains one of a minimum (non-zero) digital code value ('1'), a digital code value ($FF_{HEX}$) that disables overwriting the SNR reported to the DSLAM, or an maximum-adjusted RATE-LIMIT code.

Next, the minimum data rate at which the DSLAM is to operate is set. For this purpose, a determination is made whether a minimum data rate that has been guaranteed to the customer can be accommodated by the (TARGET) SDSL data rate. The "minimum" guaranteed data rate is compared with the difference between the TARGET SDSL rate (as stored in the TARGET register) and the (64 Kbps) data rate of the auxiliary POTS channel. As long as the difference between the TARGET SDSL rate and the (64 Kbps) data rate of the POTS channel is at least equal to or greater than the minimum guaranteed data rate, delivery of that minimum guaranteed data rate to the customer is assured. In this case, the difference between the TARGET SDSL rate and the (64 Kbps) data rate of the auxiliary POTS channel is stored as a "MINIMUM" data rate. On the other hand, if the difference between the TARGET SDSL rate and the (64 Kbps) POTS data rate is less than the minimum guaranteed data rate, the guaranteed minimum value is stored.

An ADSL training sub-routine, which is carried out for both fixed rate and best efforts modes, is then executed. First, a new ADSL train is conducted. For 'fixed' data rate mode, the RATE_LIMIT buffer will have been loaded with the value $FF_{HEX}$ that inhibits overwriting the data rate that has been pre-established by the telecom service provider. For 'best efforts' (variable) data rate mode, however, the calibration sequence will have resulted in the RATE_LIMIT buffer being loaded with either a value of '1' or a value of $FF_{HEX}$.

Once the ADSL link has trained up, the ACTUAL data rate value at which the ADSL link has trained is compared with the contents of the TARGET SDSL data rate. If the trained (ACTUAL) ADSL data rate is greater than the TARGET SDSL data rate, it is concluded that the SDSL link will not support the trained data rate. In this event, routine drops the ADSL link, and returns to 'fixed' or 'best efforts' data rate mode inquiry. For fixed mode, the ADSL training routine is reinitiated. For best efforts mode, the contents of the max_down_adj register (which had been loaded with a digital code value representative of the difference between the value ($40_{HEX}$) and a digital code value representative of the data rate at which the eventually ADSL link trained) are replaced with a code representative of the difference between the contents of the TARGET register and the ACTUAL data rate register. The routine then transitions back to the rate limit minimization sub-routine, described above.

If the SDSL link will support the (ACTUAL) data rate at which the ADSL loop is currently trained, the ACTUAL data rate is compared with the value of the MINIMUM data rate. If the MINIMUM data rate is greater than ACTUAL data rate, the routine drops the link, and proceeds as described above. If the ACTUAL data rate is greater than or equal to the MINIMUM data rate, the routine inquires whether the mode is 'best efforts' or 'fixed rate'. If 'fixed rate' mode, the DSLAM negotiation is now complete.

For 'best efforts' mode, the contents of the ACTUAL register are compared with those of the CALIBRATE register (which contains data rate at which the loop trained during calibration). If the contents of the ACTUAL data rate register are the same as the contents of the CALIBRATE data rate register, the DSLAM negotiation is complete. However, if the contents of the ACTUAL data rate register are different than the contents of the CALIBRATE data rate register, the contents of the ACTUAL data rate register are compared with the (SDSL data rate) contents of the TARGET data rate register. If the ACTUAL data rate is the same as the TARGET data rate, the DSLAM negotiation is complete).

If the contents of the ACTUAL data rate register differ from the contents of the TARGET data rate register, it is determined whether this is the first time that MAX/MIN conditions have been met. If not, a flag is set indicating that the DSLAM has now met the MAX/MIN conditions, and the routine drops the ADSL loop and proceeds as described above. However, if the MAX/MIN conditions have been satisfied once before, the DSLAM negotiation is complete.

Once DSLAM negotiation has been completed, the DSLAM's downstream data rate code stored in the ACTUAL data rate register (which has been determined to be sufficient to support the SDSL data rate and the auxiliary 64K POTS channel) is forwarded by the ALE-C to the ALE-R in the downstream site for training the customer's modem.

DETAILED DESCRIPTION

Figure 1:
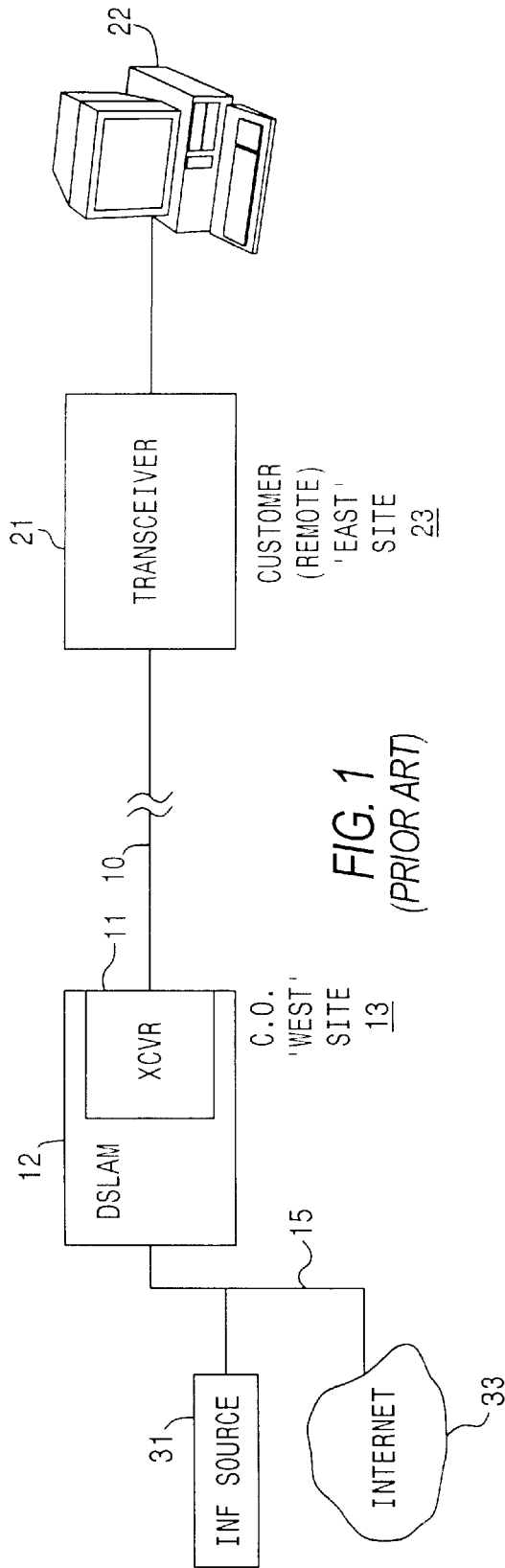
FIG. 1 diagrammatically illustrates the general architecture of a conventional DSL communication system.
Figure 2:
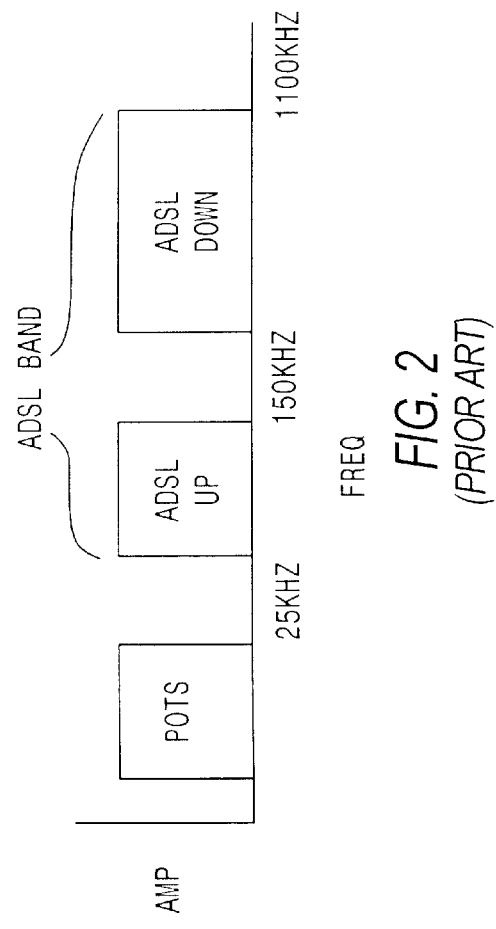
FIG. 2 shows the asymmetrical allocation of a high rate data ADSL band into a relatively larger sub-band portion for 'downstream' data transmissions from a central office site to a customer site, and a relatively smaller sub-band portion for 'upstream' data transmissions from a customer site to a central office site.
Figure 3:
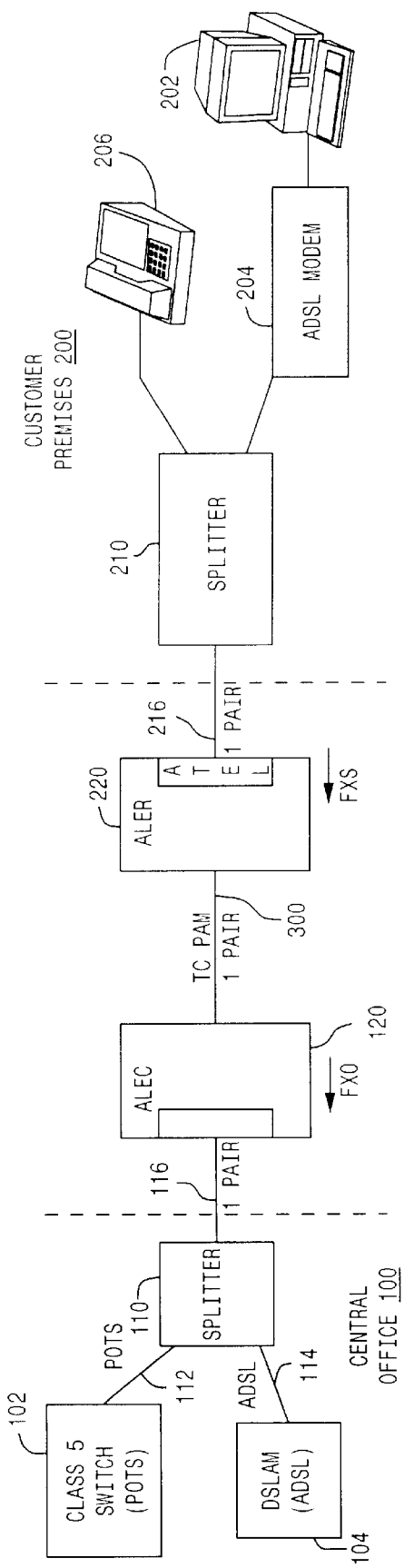
FIG. 3 diagrammatically illustrates the general architecture of a hybrid SDSL-ADSL range-extending data/POTS communication arrangement disclosed in the above-referenced '707 application.
Figure 4:
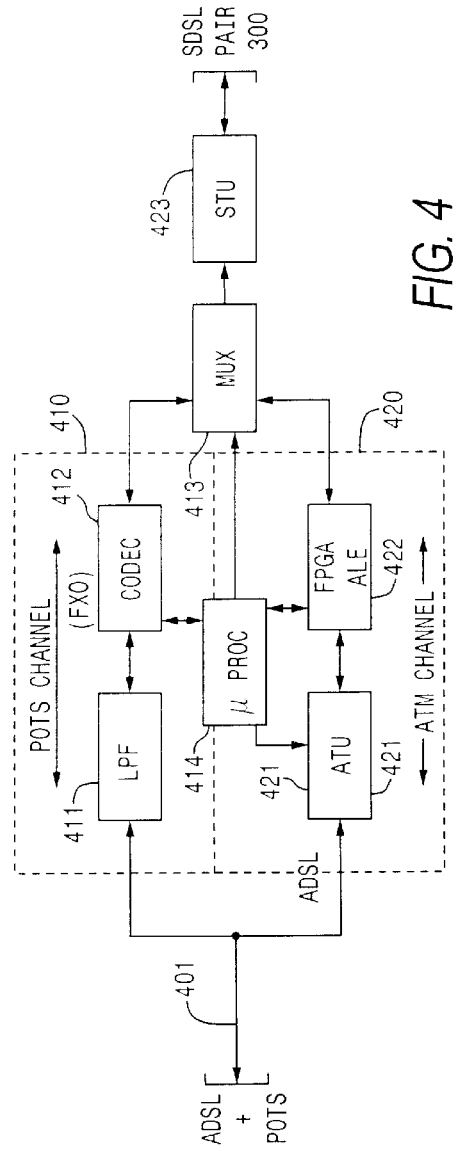
FIG. 4 shows the architecture of a ADSL Loop Extender (ALE) installed at each of the central office site and the customer site of the extended range ADSL communication scheme of FIG. 3.
Figure 5:
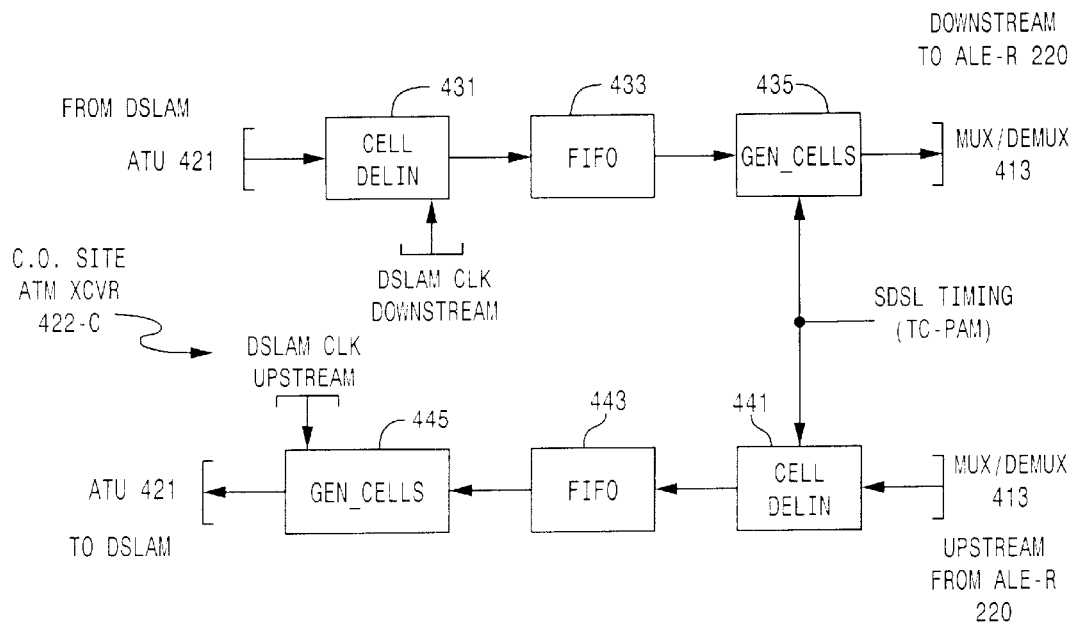
FIG. 5 shows the signal processing functionality of a network site ATM transceiver installed within an upstream ALE-C of the extended range ADSL communication scheme of FIG. 3.
Figure 6:
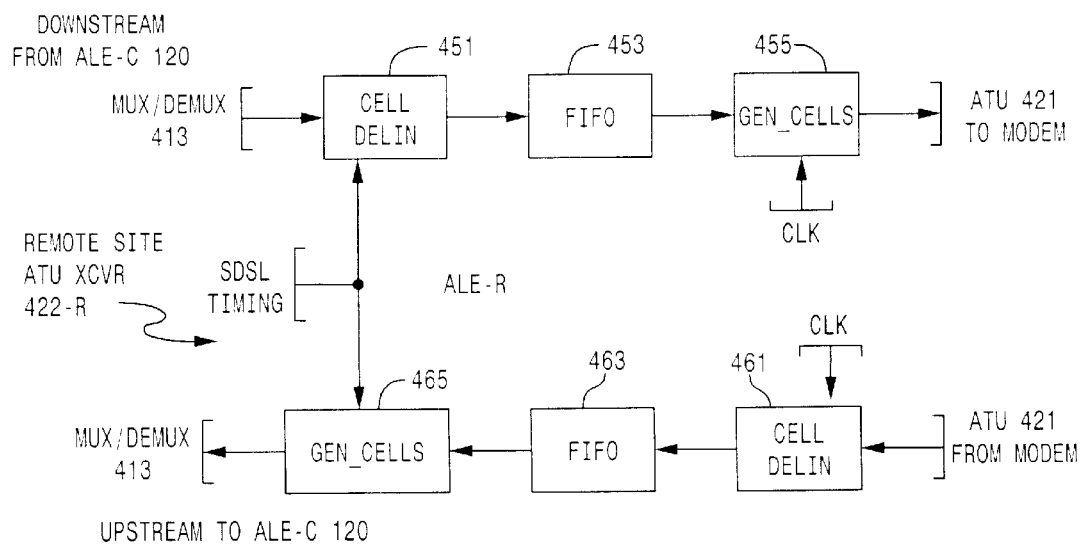
FIG. 6 shows the signal processing functionality of a customer premises site ATM transceiver of a downstream ALE-R at the downstream site of the extended range ADSL communication scheme of FIG. 3.

Before describing the ADSL data rate optimization mechanism according to the present invention, it should be observed that the invention resides primarily in a software routine, which is executable by an upstream (e.g. central office associated) link extender's supervisory communications controller, that controls the operation of telecommunication signalling components within an ADSL telecommunication system, such as that described in the above-identified '707 application. As a result, the configuration of such a system has illustrated in the drawings by readily understandable block diagrams, showing only those specific details that are pertinent to the present invention, so as not to obscure the disclosure with details which will be readily apparent to those skilled in the art having the benefit of the description herein. The data rate optimization routine itself has been illustrated in a flow chart format, which is primarily intended to show the various steps of the invention in a convenient functional sequence, whereby the present invention may be more readily understood.

For purposes of providing an illustrative embodiment, the following description will detail the application of the data rate optimization routine of the present invention to the ADSL range extension system described in the '707 application. It should be understood, however, that the communication environment described herein is merely an example of one digital signal transport scheme to which the present invention may be applied and is not to be considered limitative of the invention.

Figure 7:
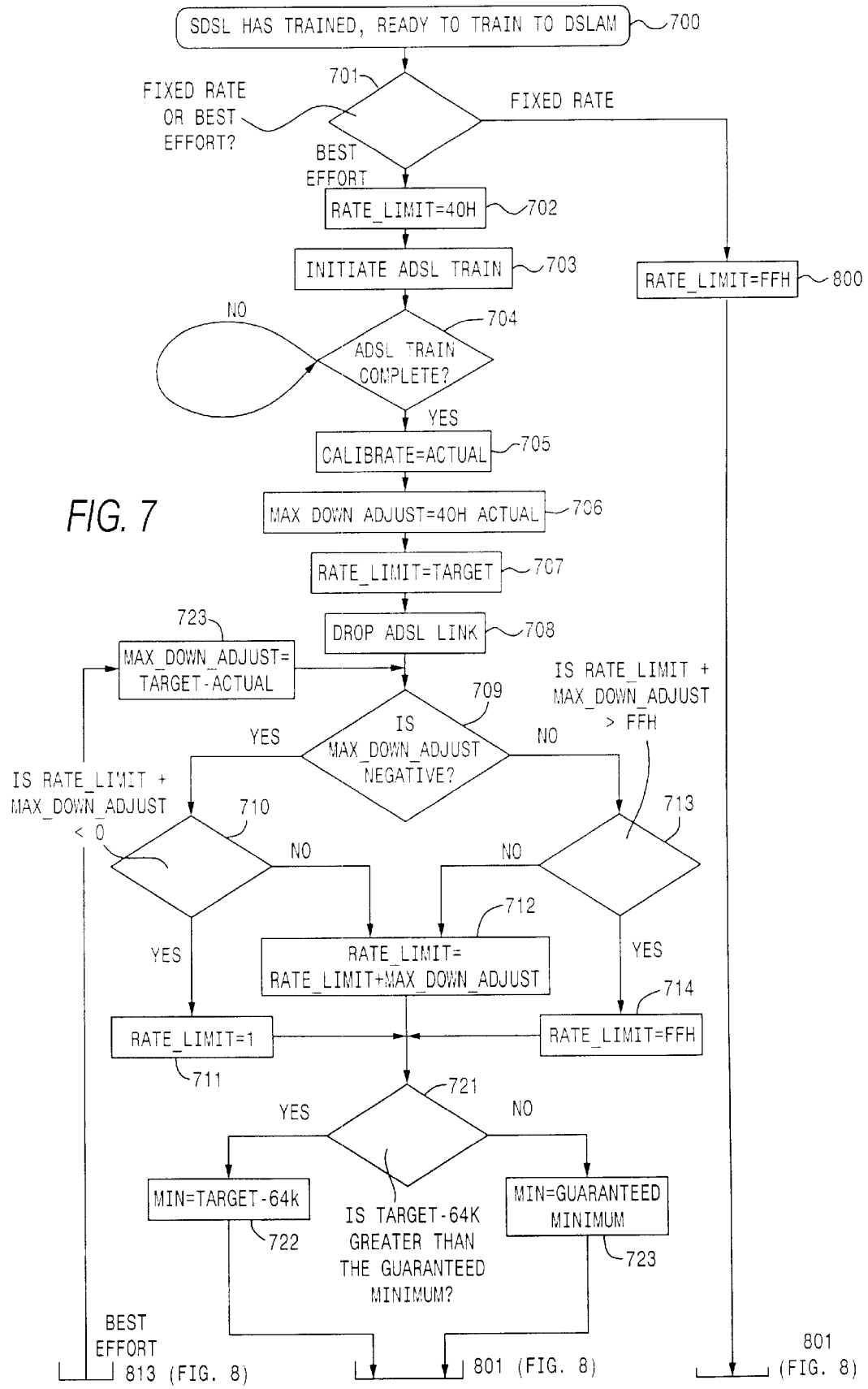
FIGS. 7 and 8 show respective steps of the DSLAM to ALE-C short haul data rate optimization routine of the invention.
Figure 8:
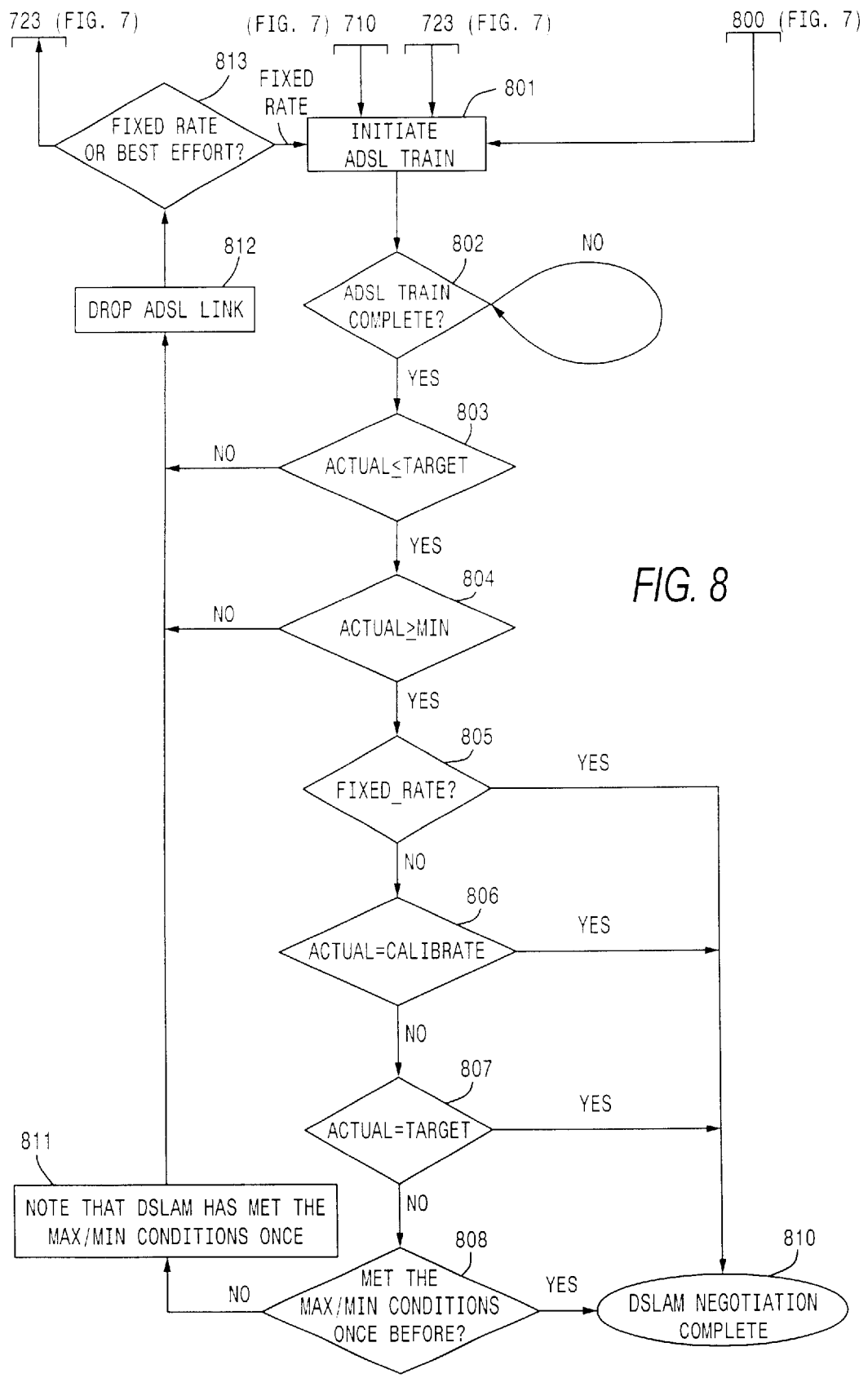
Figure 9:
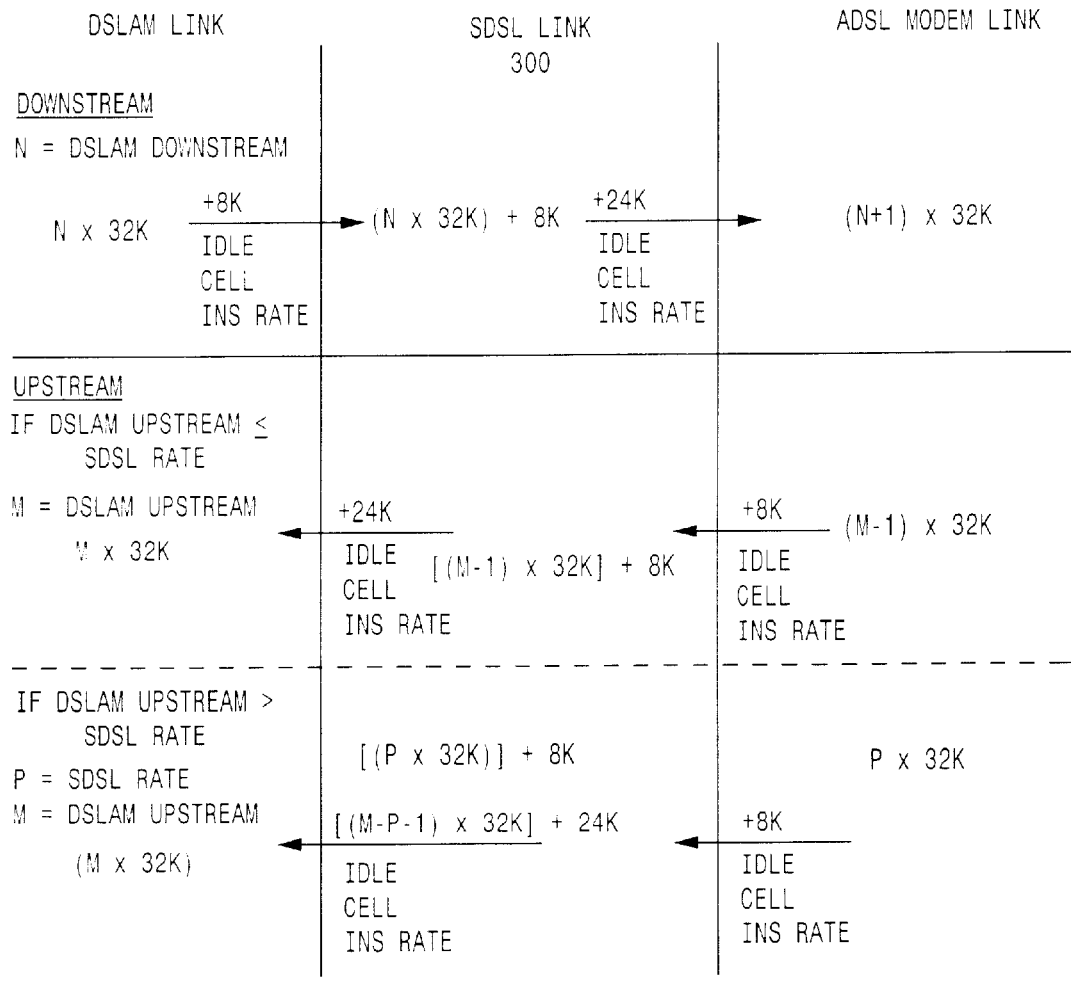
FIG. 9 is a data rate transport diagram showing downstream and upstream idle cell insertion data rates that may be employed in the ALE telecommunication system of FIG. 3.

Attention is now directed to FIGS. 7 and 8, which show the respective steps of the data rate optimization routine of the invention, as carried out by the supervisory microcontroller of the ALE-C 120 of the ADSL system of FIG. 1, described above. As pointed out previously, this ADSL data rate optimization mechanism is operative to automatically induce the DSLAM to employ a downstream ADSL data rate that is compatible with the data rate that can be supported by the SDSL link, and which provides support for an auxiliary (64K) POTS channel.

As a precursor step, the SDSL data rate optimization routine of the invention is initially supplied with a desired or "TARGET" SDSL data rate to be used for the SDSL link. In accordance with a preferred embodiment, this TARGET SDSL data rate will have been derived in accordance with a precursor SDSL autobaud mechanism detailed in the above-referenced '699 application, and used to train the SDSL loop, as identified in step 700. Given the TARGET SDSL data rate, an initial query step 701 determines whether the DSLAM is to employ a predetermined, 'fixed' data rate, or a 'best effort' data rate.

As pointed out above, where the data rate is fixed or pre-established by the telecom service provider (typically based upon non-variable parameters of line card circuitry installed in the central office), the only question to be resolved is whether the SDSL data rate is sufficient to support the fixed rate. Typically, the fixed rate will correspond to a prescribed minimum data rate that has been guaranteed to the customer. As a non-limiting example, minimum (downstream) guaranteed data rates may range between 256K to 896K, at 128K increments. Thus, a 512K× 384K service subscription would correspond to a downstream payload data rate of 512 Kbps and an upstream data rate of 384 Kbps. To accommodate the downstream payload (plus the 64K POTS channel), the SDSL link would have to have trained at least at 512K+64K or 576 Kbps. A minimum guaranteed data rate will be stored in a "GUARANTEED MINIMUM" register.

In the (fixed data rate) case, the answer to query step 701 is "FIXED," and the routine will transition to step 800, wherein a RATE_LIMIT register is loaded with a prescribed value. The RATE_LIMIT buffer is used to overwrite a signal-to-noise ratio (SNR) value that is reported to the DSLAM by the ALE-C and thereby 'spoofs' the DSLAM into training the link at a data rate that may be considerably lower than that supportable by the (relatively short) ADSL link between the DSLAM and the ALE-C. In step 800, the prescribed value that is written into the RATE_LIMIT buffer is a "DISABLE OVERWRITE" code, such as $FF_{HEX}$, to disable the overwrite.

As pointed out previously, the RATE_LIMIT buffer is one of a set of storage registers or buffers, that store various data rate parameters associated with the optimization routine of the invention. The RATE_LIMIT buffer comprises an M-bit (e.g., eight-bit) register, each increment of which represents a prescribed data rate segment (e.g., 32 Kbps or simply 32K).

Thus, in the fixed data rate case, the RATE_LIMIT buffer will be loaded with the value $FF_{HEX}$, to inhibit overwriting the data rate that has been pre-established by the telecom service provider, prior to transitioning to an 'initiate ADSL train' step 801 of the sub-routine sequence shown in FIG. 8. The sub-routine of FIG. 8 is carried out in both the fixed rate and best efforts rate cases, and will be described below.

Where the answer to query step 701 is "BEST EFFORTS" mode, the routine transitions to a 'calibration' training sequence, a first step of which is the (RATE_LIMIT=40h) step 702. In step 702, a prescribed digital value (e.g., $40_{HEX}$) associated with an initial ADSL data rate is written into the RATE_LIMIT buffer. In the present example, where each increment of the RATE_LIMIT buffer represents a 32K data rate segment, writing the value $40_{HEX}$ into the RATE_LIMIT buffer in step 702 implies a calibration training data rate of $(2^5 \times (4 \times 16^1 + 0 \times 16^0) \times 1000) = 2.048$ Mbps. It should be noted that the invention is not limited to this or any particular value. The data rate associated with this RATE_LIMIT code value (e.g., $40_{HEX}$) may vary depending upon the operational parameters of a particular DSLAM vendor's equipment. It is expected to be relatively fast (e.g., in excess of 1 Mbps), given the relative short length of the ADSL channel link 114 between the DSLAM 104 and the ALE-C.

Next, in step 703, the calibration routine initiates an ADSL train, and transitions to the self-looped query step 704, which determines when the ADSL channel link 114 from the DSLAM 104 has trained. Once the ADSL link has trained up (at some data rate), the calibration sequence transitions to step 705, wherein the data rate value at which the ADSL link has eventually trained during calibration is stored or written into a "CALIBRATE" buffer. (Typically, this value is in excess of 1 Mbps, as described above.)

The calibration sequence next transitions to step 706, wherein a "max_down_adjust" buffer is loaded with a digital code value representative of the difference between the value ($40_{HEX}$) that was previously loaded into the RATE_LIMIT buffer in step 702 and a digital code value representative of the actual data rate at which the ADSL link eventually trained during step 704. This code difference corresponds to a maximum (MAX) offset between the data rate at which the DSLAM-to-ALE-C link was originally expected to train and the data rate at which this link actually trained. As pointed out earlier, due to the normally, relatively short distance between the DSLAM and the ALE-C (typically co-located), the MAX difference code is typically (but not always) a relatively small positive number. Subsequent steps 709–714 accommodate for significant departures from this expectancy.

Next, in step 707, the contents of the PATE_LIMIT buffer are replaced with a "TARGET" digital code value. As pointed out above, the "TARGET" digital code is representative of the actual SDSL data rate (such as that derived using the SDSL autobaud mechanism detailed in the above-referenced '699 application, as described above) that the SDSL link is to support. Next, in step 708, the calibration sequence drops the ADSL link and transitions to an initial query step 709 of a rate limit minimization sub-routine.

In query step 709, a determination is made as to whether the digital code value that was loaded into the max_down_adjust buffer in step 706 has a negative or a positive value. If the contents of the max_down_adjust buffer are negative (the answer to query step 709 is YES), it is inferred that the difference between the initial calibration data rate at which the loop is expected to train and the data rate at which it has actually trained is relatively large, and the routine transitions to query step 710. In step 710, the calibration routine determines whether adding the digital value currently stored in the RATE_LIMIT BUFFER (the TARGET SDSL data rate) to that stored in the max_down_adjust buffer will result in an underflow of the max_down_adjust buffer.

If so (the answer to query step 710 is YES), the routine transitions to step 711, which replaces the (TARGET SDSL data rate associated) digital code in the RATE_LIMIT buffer with a minimum (non-zero) value of '1'. The routine then transitions to query step 721. However, if the answer to query step 710 is NO (the sum of the digital value currently stored in the RATE_LIMIT BUFFER and that stored in the max_down_adjust buffer is non-negative), the routine transitions to step 712. In step 712, the (TARGET SDSL data rate) code in the RATE_LIMIT buffer is augmented by the contents of the max_down_adjust buffer (representative of the difference between the value ($40_{HEX}$) and the data rate at which the eventually ADSL link trained), and the routine transitions to step 721.

If the answer to query step 709 is YES (i.e. the contents of the max_down_adjust buffer are positive), it is inferred that the data rate at which the loop has actually trained is relatively close to its expected value, and the routine transitions to query step 713. In step 713, the routine determines whether adding the digital value currently stored in the RATE_LIMIT BUFFER to that stored in the max_down_adjust buffer will result in an overflow of the max_down_adjust buffer. If not (the answer to query step 713 is NO), the routine transitions to step 712.

In step 712 the (TARGET SDSL data rate) code in the RATE_LIMIT buffer is augmented by the contents of the max_down_adjust buffer (representative of the difference between the value ($40_{HEX}$) and the data rate at which the eventually ADSL link trained). The routine then transitions to step 721, as described above. If the answer to query step 713 is YES, however, the routine transitions to step 714, which replaces the (TARGET SDSL data rate associated) digital code in the RATE_LIMIT buffer with an all one's value of $FF_{HEX}$ (that disables overwriting the SNR reported to the DSLAM, as pointed out above), and the routine transitions to query step 714. Thus, at the completion of steps 709–714, the RATE_LIMIT buffer will contain one of a minimum (non-zero) digital code value ('1'), a digital code value ($FF_{HEX}$) that disables overwriting the SNR reported to the DSLAM, or an maximum-adjusted RATE-LIMIT code.

In steps 721–723, the routine sets the minimum data rate at which the DSLAM is to operate. In query step 721, a determination is made whether a minimum data rate that has been guaranteed to the customer can be accommodated by the (TARGET) SDSL data rate. (As pointed out above, a range of minimum guaranteed data rates may be employed (e.g., ranging from 256K to 896K, at 128K increments)). In step 721, a "minimum" guaranteed data rate (as stored in a "GUARANTEED MINIMUM" register) is compared with the difference between the TARGET SDSL rate (as stored in the TARGET register) and the (64 Kbps) data rate of the auxiliary POTS channel.

As long as the difference between the TARGET SDSL rate and the (64 Kbps) data rate of the auxiliary POTS channel is at least equal to or greater than the minimum guaranteed data rate, then delivery of that minimum guaranteed data rate to the customer is assured. In this case (the answer to step 721 is YES), the routine transitions to step 722, wherein the difference between the TARGET SDSL rate and the (64 Kbps) data rate of the auxiliary POTS channel is stored in a "MINIMUM" data rate register. The routine then transitions to step 801 of the ADSL training sub-routine of FIG. 8, to be described. However, if the difference between the TARGET SDSL rate and the (64 Kbps) POTS data rate is less than the minimum guaranteed data rate, the routine transitions to step 723, wherein the guaranteed minimum value is stored in the MINIMUM data rate register. The routine then transitions to step 801 of the ADSL training sub-routine of FIG. 8.

At step 801, a new ADSL train is initiated (using the data rate code value currently stored in the RATE-LIMIT register), and transitions to self-looped query step 802, to determine when the ADSL channel link 114 from the DSLAM 104 has trained. As noted above, in the case of 'fixed' data rate mode, the RATE_LIMIT buffer will have been loaded in step 800 with the value $FF_{HEX}$ that inhibits overwriting the data rate that has been pre-established by the telecom service provider. For 'best efforts' (variable) data rate mode, however, the calibration sequence described above will have resulted in the RATE_LIMIT buffer being loaded with one of a minimum (non-zero) digital code value ('1'), a digital code value ($FF_{HEX}$) that disables overwriting the SNR reported to the DSLAM, or an maximum-adjusted RATE-LIMIT code.

Once the ADSL link has trained up in step 802, the sequence transitions to query step 803, wherein the ACTUAL data rate value at which the ADSL link is now trained is compared with the contents of the TARGET SDSL data rate as supplied in step 700. If the trained (ACTUAL) ADSL data rate is greater than the TARGET SDSL data rate (the answer to query step 803 is NO), it is concluded that the SDSL link will not support the trained data rate, and the routine transitions to step 812, which drops the ADSL link. The routine then transitions to query step 813, which determines again whether the DSLAM is to employ a predetermined, 'fixed' data rate, or a 'best effort' data rate.

Where the answer to query step 813 is "FIXED" mode, the routine will return to step 801. However, where the answer to query step 813 is "BEST EFFORTS" mode, the routine transitions to step 723 of the routine of FIG. 7, wherein the contents of the max_down_adj register are replaced. It will be recalled that in step 706, the max_down_adj register had been loaded with a digital code value representative of the difference between the value ($40_{HEX}$) and a digital code value representative of the data rate at which the eventually ADSL link trained during step 704. In step 724, the contents of the max_down_adj register are replaced with a code representative of the difference between the contents of the TARGET (SDSL data rate) register and the ACTUAL (currently trained) data rate register. The routine then transitions to step 709 and proceeds as described above.

If the answer to step 803 is YES (implying that the SDSL link will support the (ACTUAL) data rate at which the loop is currently trained, the routine transitions to query step 804. In query step 804, the ACTUAL data rate is compared with the value of the MINIMUM data rate (as stored in the MINIMUM data register in step 722 or 723 for best efforts mode). If the MINIMUM data rate is greater than ACTUAL data rate (the answer to query step 804 is NO), the routine transitions to step 812, as described above. On the other hand, if the ACTUAL data rate is greater than or equal to the MINIMUM data rate, the routine transitions to query step 805, which inquires whether the mode is 'best efforts' or 'fixed rate'.

If the answer to query step 805 is YES ('fixed rate' mode), the routine transitions exits at step 810 (the DSLAM negotiation is complete). On the other hand, for 'best efforts' mode (the answer to query step 805 is NO), the routine transitions to query step 806. Query step 806 compares the current contents of the ACTUAL data rate register with the contents of the CALIBRATE data rate register (previously stored in step 705 with the data rate at which the loop eventually trained during the calibration sequence.

If the current contents of the ACTUAL data rate register are the same as the contents of the CALIBRATE data rate register (the answer to step 806 is YES), the routine exits at step 810 (the DSLAM negotiation is complete). However, if the current contents of the ACTUAL data rate register are different than the contents of the CALIBRATE data rate register (the answer to query step 806 is NO), the routine transitions to query step 807.

In query step 807, the contents of the ACTUAL data rate register are compared with the (SDSL data rate) contents of the TARGET data rate register. If the ACTUAL data rate is the same as the TARGET data rate (the answer to query step 807 is YES), the routine exits at step 810 (the DSLAM negotiation is complete). If, however, the contents of the ACTUAL data rate register differ from the contents of the TARGET data rate register (the answer to query step 807 is NO), the routine transitions to step 808.

Query step 808 determines whether this is the first time that MAX/MIN conditions (of steps 803 and 804) have been met. If the answer to query step 808 is NO, the routine transitions to step 811. In step 811, a flag is set indicating that the DSLAM has met the MAX/MIN conditions, and the routine transitions to step 812, described above. However, if the answer to query step 808 is YES (implying that the MAX/MIN conditions have been satisfied once before), the routine exits at step 810 (the DSLAM negotiation is complete).

Once DSLAM negotiation is complete (the routine has transitioned to step 810), the finally arrived at data rate currently stored in the ACTUAL data rate register (which has been determined to be sufficient to support the SDSL data rate and the auxiliary 64K POTS channel) is forwarded by the ALE-C to the ALE-R in the downstream site for training the customer's modem.

As will be appreciated from the foregoing description, the normal tendency of a DSLAM to transmit data at as high a data rate at which an associated short haul loop will train is controllably modified by the downstream rate establishment mechanism of the invention, which effectively 'spoofs' the DSLAM into perceiving that the short haul loop is a much longer loop. As a result, the DSLAM is selectively induced to transmit at a downstream ADSL data rate that is compatible with the data rate supported by the SDSL link (and also accommodates an auxiliary (64K) POTS channel).

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. For use with an asymmetrical digital subscriber line (ADSL) communication system, having an upstream transceiver coupled over a first, relatively short haul communication loop to an ADSL communication device that provides access to one or more digital communication resources of a telecommunication network, said ADSL communication device being capable of transmitting over said first, relatively short haul communication loop at a relatively high data rate, said upstream transceiver being further coupled over a second, relatively long haul communication loop to a downstream transceiver, said downstream transceiver being coupled over a third loop to a customer premises equipment communication device, a method of establishing a communication data rate to be employed by said ADSL communication device for downstream communications to said upstream transceiver comprising the steps of:

(a) prescribing a second loop data rate that can be supported by said second, relatively long haul communication loop; and (b) training said ADSL communication device to conduct downstream communications over said first, relatively short haul loop, at a downstream communication data rate that is less than said relatively high data rate, and which is dependent upon said second loop data rate prescribed in step (a).

2. The method according to claim 1, wherein step (a) comprises conducting measurements upon said second, relatively long haul communication loop to determine said second loop data rate.

3. The method according to claim 1, wherein said downstream communication data rate is less than said second loop data rate prescribed in step (a).

4. The method according to claim 3, wherein said downstream communication data rate is less than said second loop data rate prescribed in step (a) by an amount that accommodates an auxiliary communication channel data rate.

5. The method according to claim 4, wherein said auxiliary communication channel data rate corresponds to that of an auxiliary plain old telephone service (POTS) channel.

6. The method according to claim 1, wherein step (b) comprises conducting a preliminary calibration training routine that causes said ADSL communication device to train to an initial downstream communication data rate, and thereafter modifying said initial downstream communication data rate to realize said downstream communication data rate that is less than said initial downstream data rate, and which is dependent upon said second loop data rate prescribed in step (a).

7. The method according to claim 1, wherein said downstream communication data rate is defined in accordance with a guaranteed minimum data rate for downstream ADSL communications to said customer premises equipment.

8. The method according to claim 7, wherein said guaranteed minimum data rate is no less than the difference between said second loop data rate prescribed in step (a) and the data rate of an auxiliary plain old telephone service (POTS) channel.

9. The method according to claim 1, wherein step (b) comprises attempting to train said ADSL communication device to conduct downstream communications at a fixed data rate and, in response to said ADSL communication device successfully training at said fixed data rate, enabling said ADSL communication device to conduct downstream communications at said fixed data rate, provided that said fixed data rate is no greater than said second loop data rate prescribed in step (a).

10. The method according to claim 9, wherein step (b) comprises enabling said ADSL communication device to conduct downstream communications at said fixed data rate, provided that said fixed data rate is no greater than the difference between said second loop data rate prescribed in step (a) and the data rate of an auxiliary communication channel.

11. For use with an asymmetrical digital subscriber line (ADSL) communication system, having an upstream transceiver coupled over a first, relatively short haul communication loop to an ADSL communication device, ADSL communication device providing access to one or more digital communication resources of a telecommunication network and being capable of conducting communications over said first, relatively short haul communication loop at a relatively high data rate that conforms with a prescribed communication standard, said upstream transceiver being further coupled to a downstream transceiver by way of a second, relatively long haul communication loop, that is capable of supporting communications thereover at a second loop data rate, which is less than said relatively high data rate and does not conform with said prescribed communication standard at said relatively high data rate, said downstream transceiver being coupled over a third loop to a customer premises equipment communication device, a method of establishing a communication data rate to be employed by said ADSL communication device for conducting downstream communications to said upstream transceiver comprising the steps of:

(a) providing information to said ADSL communication device representative of a reduced data rate for downstream communications thereby over said first, relatively short haul communication loop less than said relatively high data rate, and which is dependent upon said second loop data rate; and (b) selectively enabling said ADSL communication device to conduct downstream communications over said first, relatively short haul loop at said reduced data rate.

12. The method according to claim 11, wherein said second loop data rate is derived in accordance with measurements conducted on said second, relatively long haul communication loop, based on transmissions between said upstream and downstream transceivers.

13. The method according to claim 11, wherein said downstream communication data rate is less than said second loop data rate prescribed in step (a) by an amount that accommodates an auxiliary communication channel data rate.

14. The method according to claim 11, wherein said downstream communication data rate is less than said second loop data rate prescribed in step (a) by an amount that accommodates an auxiliary plain old telephone service (POTS) channel.

15. The method according to claim 11, wherein step (a) comprises conducting a preliminary calibration training routine that causes said ADSL communication device to train to an initial downstream communication data rate, and thereafter modifying said initial downstream communication data rate in accordance with said information representative of said reduced data rate for downstream communications, to realize said reduced data rate that is less than said initial downstream data rate, and which is dependent upon said second loop data rate.

16. The method according to claim 11, wherein said reduced downstream communication data rate is defined in accordance with a guaranteed minimum data rate for downstream ADSL communications to said customer premises equipment.

17. The method according to claim 16, wherein said guaranteed minimum data rate is no less than the difference between said second loop data rate and the data rate of an auxiliary plain old telephone service (POTS) channel.

18. The method according to claim 11, wherein step (b) comprises attempting to train said ADSL communication device to conduct downstream communications at a fixed data rate and, in response to said ADSL communication device successfully training at said fixed data rate, enabling said ADSL communication device to conduct downstream communications at said fixed data rate, provided that said fixed data rate is no greater than said reduced data rate.

19. The method according to claim 18, wherein step (b) comprises enabling said ADSL communication device to conduct downstream communications at said fixed data rate, provided that said fixed data rate is no greater than the difference between said second loop data rate and the data rate of an auxiliary communication channel.

20. The method according to claim 19, wherein said ADSL communication device comprises a digital subscriber line access multiplexer.

* * * * *